United States Patent [19]

Kogure

[11] Patent Number: 4,505,074
[45] Date of Patent: Mar. 19, 1985

[54] GRINDING MACHINE CONTROL SYSTEM FOR INTERMITTENTLY MEASURING WORKPIECE SIZE

[75] Inventor: Toshiharu Kogure, Narashino, Japan

[73] Assignee: Seiko Seiki Kabushiki Kaisha, Chiba, Japan

[21] Appl. No.: 379,153

[22] Filed: May 17, 1982

[30] Foreign Application Priority Data

May 21, 1981 [JP] Japan .................................. 56-76909

[51] Int. Cl.³ ............................................. B24B 49/04
[52] U.S. Cl. ................................ 51/165.77; 51/165.93; 51/50 R
[58] Field of Search ............ 51/165.93, 165.91, 165.77, 51/165 R, 50 R

[56] References Cited

U.S. PATENT DOCUMENTS

| 1,918,198 | 7/1933 | Tornebohm | 51/165.93 |
| 3,785,091 | 1/1974 | Pozzetti | 51/165.91 |
| 3,846,689 | 11/1974 | Possati | 51/165.91 |
| 3,964,210 | 6/1976 | Moritomo | 51/165.91 |
| 4,117,634 | 10/1978 | Sugita | 51/165.91 |

FOREIGN PATENT DOCUMENTS 6193 1/1977 Japan .................... 51/165.93

Primary Examiner—Harold D. Whitehead
Attorney, Agent, or Firm—Robert E. Burns; Emmanuel J. Lobato; Bruce L. Adams

[57] ABSTRACT

A grinding machine control system has a position detecting device for generating a position signal indicative of the position of a cutting table which is driven at a variable speed by a cutting motor during a grinding process, and a size measuring device for intermittently measuring the workpiece size. A grinding stone table is reciprocally movable relative to the cutting table and carries a grinding stone for grinding the workpiece. A cutting table position signal and a cutting speed signal are intermittently measured under the control of a timing signal which is synchronized with the period of reciprocation of the grinding stone table during the grinding process and are temporarily held as sampling signals. A transient cutting residual amount signal $g_0$ is obtained by subtracting the workpiece size signal from the sampled cutting table position signal, an error cutting residual amount signal $g_3$ is obtained by subtracting the standard cutting residual amount signal $g_1$ from the transient cutting residual amount signal $g_0$, and a speed correction signal $Vg_3$ is obtained by dividing the error cutting residual amount $g_3$ by the sampling time interval "T". The speed correction signal $Vg_3$ is added to a sampled cutting speed signal V, and a composite signal composed of the speed correction signal $Vg_3$ and the cutting speed V is applied to control the cutting speed of the cutting motor until the next sampling time.

6 Claims, 2 Drawing Figures

GRINDING MACHINE CONTROL SYSTEM FOR INTERMITTENTLY MEASURING WORKPIECE SIZE

BACKGROUND OF THE INVENTION

The present invention relates to a grinding machine having a size-measuring device for intermittently measuring a size of a workpiece.

A method for controlling a cutting operation while the size of workpiece is continuously measured by an inprocess, is known. This prior art method comprises the steps of: detecting the position of a cutting table and a residual amount of cutting corresponding to a deflection of the shaft of the grinding stone on the basis of the difference of the size signal from the size-measuring device, and controlling the position of the cutting table in such a way that the residual amount of cutting is always constant.

However, in the case of grinding the interior of workpiece in size, it is alternately required for measuring the size of the workpiece to touch the workpiece with a contactor of the size-measuring device and to detach the contactor from the workpiece in relation to the reciprocating motion of the shaft of the grinding stone. Therefore, when the method for controlling the position of the cutting table is applied to the grinding machine in which the size of the workpiece is intermittently measured, the position of the cutting base is necessarily moved intermittently every measuring operation, so that a controlling error is produced in relation to the measuring interval. Consequently, it is difficult to control the residual amount of the cutting to always be constant.

The present invention is intended to improve the conventional method, and an object of the present invention is to provide a control system of a grinder which is capable of maintaining the residual amount of cutting constant by controlling the speed of a cutting table at the interval of the measuring timing so that movement of a cutting table is kept in an approximate linear condition.

The grinding machine control device of the present invention comprises a workpiece size-measuring device for intermittently measuring a size of a workpiece, a position detector for detecting the position of a cutting table; means for computing the transient residual amount of cutting in synchronization with the measuring timing on the basis of the detected size and position of the workpiece, means for computing a speed correcting component on the basis of the error in said residual amount to the reference residual amount of cutting, and a cutting control means for controlling the speed of the cutting table by adding said speed correcting component to the present speed of the cutting table. An embodiment of the present invention will now be described in more detail in conjunction with the drawings.

BRIEF DESCRIPTION OF DRAWINGS

In FIG. 1, numeral 1 is a centerless internal grinding machine which is shown schematically, for example, and the internal grinding machine 1 has a grinding stone spindle 3 mounted on a grinding stone table at one side thereof and a cutting table 4 positioned so as to face the grinding stone spindle 3. The grinding stone table 2 is arranged so as to be allowed to reciprocate relative to the cutting table 4 and the cutting table 4 is capable of moving in the direction perpendicular to the direction of motion of a head 3a of the grinding stone spindle 3 by the use of a servo motor 5.

Figure 1:
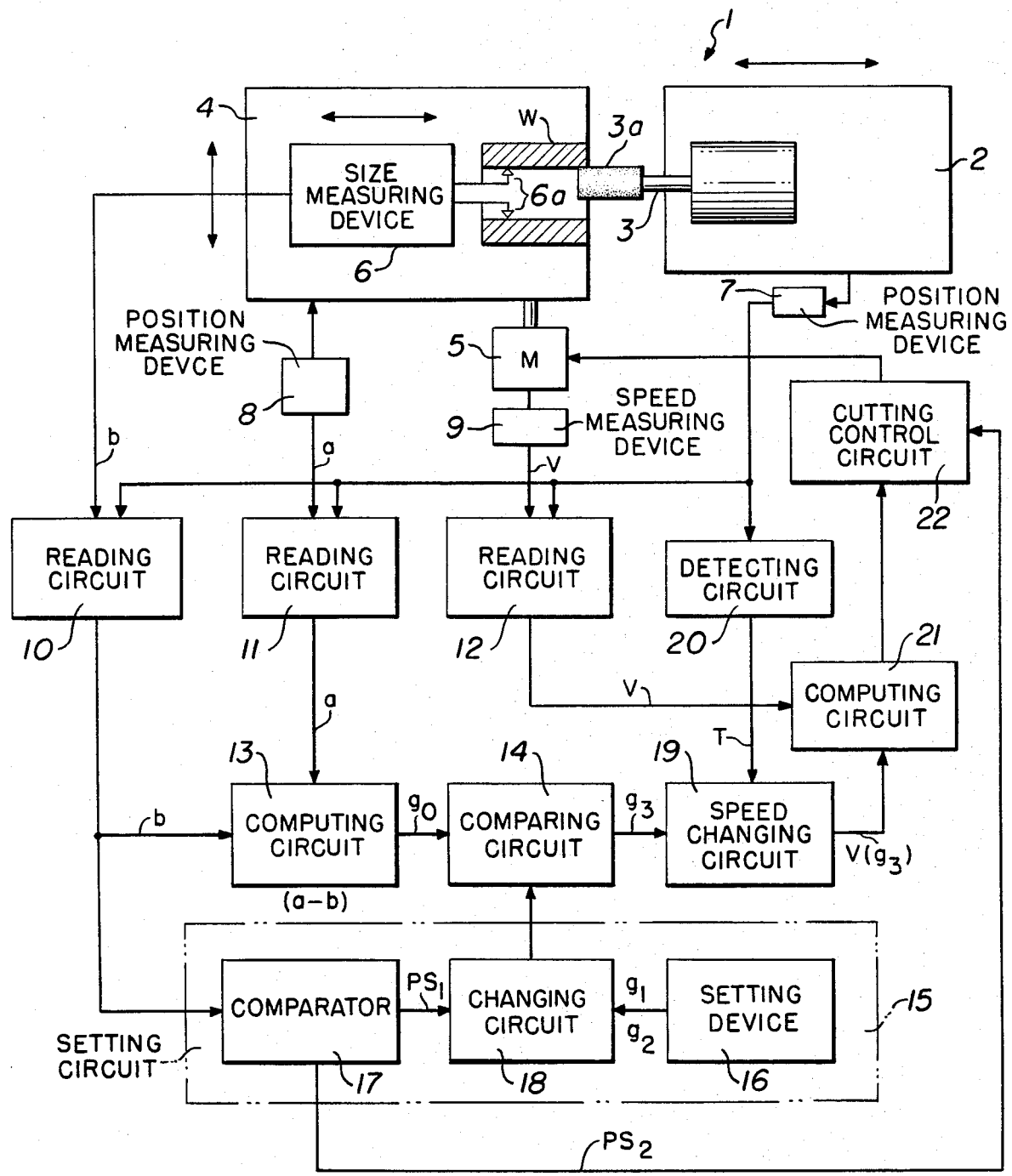
FIG. 1 is a block diagram illustrating an outline of a control system of the present invention.

A workpiece "W" clamped by a workpiece spindle head (not shown) is set on the cutting table 4 and a workpiece size-measuring device 6 having contactors 6a, which touch the inner surface and detach therefrom alternately in relation to the reciprocation of the grinding stone spindle 3, is positioned at the rear portion of the workpiece "W". The size-measuring device 6 is advanced in response to the backward movement of the grinding stone spindle 3 and the inner size of the workpiece can be detected by impressing the contactors 6a to the inner surface of the workpiece.

A device 7 for measuring the position of the grinding stone table 2, which is capable of detecting the positions in forward moving thereof and backward moving thereof, is provided on the grinding stone table 2 and a cutting table position measuring device 8 for detecting the cutting position is provided on the cutting table 4. In addition, a cutting speed measuring device 9, such as a tacho-generator, is provided with the motor 5.

A workpiece size detection signal "b" from the size-measuring device 6, a cutting position detection signal "a" from the cutting table position measuring device 8 and a speed detected signal "V" from the cutting speed measuring device 9 are input to a size reading circuit 10, a cutting table position reading circuit 11 and a cutting speed reading circuit 12, respectively, in synchronization with the output signal from the grinding stone table measuring device 7 so that the reading circuits 10, 11 and 12 are operated at a periodicity synchronized with the period of reciprocation of the grinding stone table 2.

The workpiece size detection signal "b" and the cutting position detection signal "a" which are read into the reading circuits 10 and 11, respectively, are applied to a first computing circuit 13, wherein the difference signal (a-b), that is, a transient residual amount of cutting, is computed. The value $g_0$ which represents the residual amount of cutting is applied to one input side of a comparing circuit 14.

A reference value produced by a reference residual amount setting circuit 15 is input to the other input side of the comparing circuit 14, in which the subtract calculation between the actual residual amount of cutting $g_0$ and the reference residual amount of cutting "$g_1$" or "$g_2$" is carried out to product an error residual cutting amount signal "$g_3$".

"$g_1$" is a reference residual amount of cutting in a coarse or rough grinding step and the signal "$g_2$" is a reference residual amount of cutting in a fine or finish grinding step. The setting circuit 15 has a setting device 16 for generating the reference residual signals "$g_1$" and "$g_2$" of cutting, and a comparator 17 compares the workpiece size detection signal "b" produced from the measured size reading circuit 10 with a workpiece reference size signal at the time of the change between the rough grinding step and the finish grinding step and produces a signal "$PS_1$" for changing the rough grinding step to the finish grinding step and applies the signal $PS_1$ to a changing circuit 18 when the signal "b" is coincident with the workpiece reference signal. The comparator 17 is adapted to produce an end signal "PS$_2$" which is applied to a cutting control circuit 22 (which will be described latter) when the value of the workpiece size detection signal "b" is equal to the desired target value.

Then, the error residual cutting amount signal "g$_3$" showing the difference (i.e., error) between the reference residual amount "g$_1$" or "g$_2$" of cutting and the transient cutting residual amount "g$_0$" of cutting is computed in the comparator 14 and is applied to a speed changing circuit 19.

On the other hand, the table position signal from the device 7 for measuring the position of the grinding stone table 2 is applied to a period detecting circuit 20 to be changed into a reciprocating period or time interval signal "T" of the grinding stone table 2. The time signal "T" is applied the speed changing circuit 19 in which the value obtained by dividing the signal of the error residual cutting amount g$_3$ by the period "T", that is, a speed correction signal "V(g$_3$)" corresponding to the value for speed increase/decrease is computed.

This speed correction signal "V(g$_3$)" is applied to a second computing circuit 21 and is added to the speed signal "V" from the cutting speed reading circuit 12. The resulting value is applied as a speed command signal to a cutting control circuit 22 of the servo motor 5. As a result, the servo motor 5 is controlled in accordance with the value obtained by adding the present speed to the increasing/decreasing speed command signal.

In addition, when the end signal PS$_2$ from the comparator 17 is applied to the cutting control circuit 22, in response thereto, a command signal for rapidly returning the cutting table 4 is produced from the cutting control circuit 22 and is applied to the servo motor 5, so that the cutting table 4 is rapidly driven back to the original position at the time when the grinding operation is finished.

Figure 2:
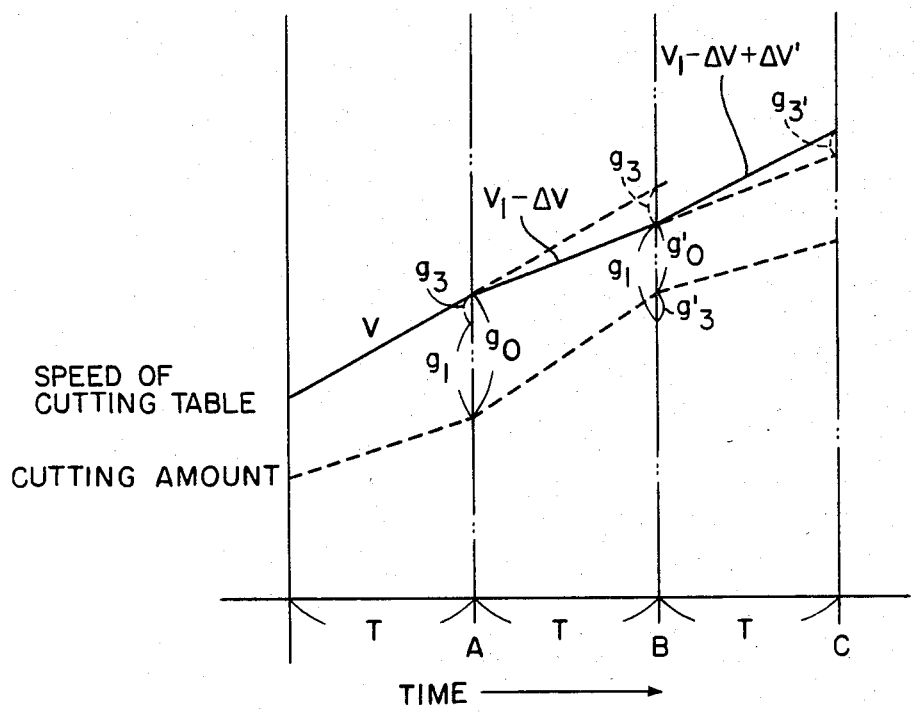
FIG. 2 is a graph for explaining the operation of grinding a workpiece by the control system of the present invention.

Now, the operation for grinding a workpiece in accordance with the control system arranged as described above, will be described in conjunction with FIG. 2.

At first, assuming the size of the workpiece and the position and the speed of the cutting table at the time "A", if the transient residual amount "g$_0$" of cutting is more than the reference residual amount g$_1$ of cutting, the speed correction signal g$_3$($<$0) is divided by the period "T", and the resulting value "$\Delta$V" is added to (subtracted from) the speed "V" indicated by the slope of the solid line. This causes the cutting table 4 to move at the speed (V$_1$-$\Delta$V) during the time interval between the time "A" and the time "B". By this operation, when the transient residual amount "g'$_0$" of cutting at time "B" becomes less than the reference residual amount "g$_1$" of cutting, the speed correction signal "g'$_3$" ($>$0) is divided by the period "T" and the value $\Delta$V' is added to the present speed V-$\Delta$V so that the cutting table 4 is moved at the speed V-$\Delta$V$\Delta$V' until the next time "C". The transmitting speed of the cutting table is controlled at successive time intervals in a similar way to the operation described above, and the actual residual amount of cutting becomes close to the reference residual amount of cutting.

As described above, according to the device for controlling the grinding operation of the present invention, since the control of the feeding speed of the cutting table is carried out intermittently at the interval of the measuring timing, it is possible to maintain the residual amount of cutting at a constant value as compared with the conventional control system, and it is advantageous that the high accuracy working in size can be carried out so that a roughness of the working surface, cylindrical evenness and the like are remarkably improved.

I claim:

1. A control system for a grinding machine of the type having a movable cutting table for holding a workpiece and which is movable in an infeed direction along a first axis, and a movable grinding stone table carrying thereon a grinding stone and which is reciprocably movable along a second axis at a certain period of reciprocation to effect grinding of the workpiece by the grinding stone, the control system comprising: variable speed drive means for infeeding the cutting table in the infeed direction along the first axis at a variably settable infeeding speed; speed detecting means for periodically detecting the infeeding speed of the cutting table at a periodicity synchronized with the period of reciprocation of the grinding stone table and producing a corresponding speed signal; workpiece size detecting means for periodically detecting the size of the workpiece being grinded by the grinding stone at a periodicity synchronized with the period of reciprocation of the grinding stone table and comparing the detected size with a reference value and producing a resultant error signal indicative of the difference between the detected size and the reference value; and computing means responsive to the speed signal and the error signal for periodically computing a speed correction signal at a periodicity synchronized with the period of reciprocation of the grinding stone table and applying the same to the variable speed drive means to accordingly control the infeeding speed of the cutting table.

2. A control system according to claim 1; wherein the workpiece size detecting means comprises a size measuring device for measuring the size of the workpiece being grinded and producing a workpiece size signal indicative of the measured size, a position measuring device for measuring the position of the cutting table along the first axis and producing a corresponding position signal, and circuit means receptive of the workpiece size signal and the position signal for periodically computing therefrom the error signal at a periodicity synchronized with the period of reciprocation of the grinding stone table.

3. A control system according to claim 2; wherein the circuit means comprises a computing circuit receptive of the workpiece size signal and the position signal for computing therefrom a difference signal, and comparing means receptive of the difference signal and a reference value signal for comparing the two signals and producing the error signal.

4. A control system according to claim 3; wherein the circuit means further includes a setting circuit for setting two reference values corresponding to coarse and fine grinding conditions and for selectively applying either a coarse grinding reference value signal or a fine grinding reference value signal to the comparing means.

5. A control system according to claim 1; further comprising table position detecting means for detecting when the grinding stone table reaches a predetermined position along the second axis during reciprocation thereof and producing a corresponding timing signal which is applied to the speed detecting means, workpiece size detecting means and computing means for controlling the periodic operation thereof at a periodicity synchronized with the period of reciprocation of the grinding stone table.

6. A grinding machine control device comprising in combination: a position detecting device for detecting the position of a cutting table during a grinding process and producing a corresponding position signal; a size measuring device for intermittently measuring a workpiece size and producing a corresponding workpiece size signal; a grinding stone table mounted for reciprocable movement and carrying thereon a grinding stone; a grinding stone table position measuring device for producing a table position signal each time the grinding stone table moves to a certain position; a detecting circuit for detecting a time interval T of the table position signal produced by said grinding stone table position measuring device; a cutting motor for effecting movement of said cutting table; a cutting speed measuring device for detecting the cutting speed of said cutting table and producing a corresponding speed signal; a size reading circuit for holding a sample signal of the workpiece size signal in response to the table position signal produced by said grinding stone table position measuring device; a position reading circuit for holding a sample signal of the position signal in response to the table position signal produced by said grinding stone table position measuring device; a speed reading circuit for holding a sample signal of the speed signal in response to the table position signal produced by said grinding stone table position measuring device; a first computing circuit for calculating a transient cutting residual amount signal $g_0$ by computing the difference between the output signals of said positive reading circuit and said size reading circuit; a setting circuit for generating two kinds of standard residual cutting amount signals $g_1$ and $g_2$ and for setting either a coarse grinding condition or a fine grinding condition in accordance with the output of said size reading circuit; a comparison circuit for generating an error residual cutting amount signal $g_3$ obtained by comparing the signals $g_1$ or $g_2$ with the signal $g_0$; a speed changing circuit for producing a speed correction signal $V.g_3$ by dividing said error residual cutting amount signal $g_3$ by an output signal of said detecting circuit; a second computing circuit for adding the speed correction signal $V.g_3$ to a cutting table speed signal sampled by said speed reading circuit; and a cutting control circuit for driving said cutting motor at a speed proportional to an output signal $V+V.g_3$ of said second computing circuit; whereby the workpiece size signal, the cutting table position signal and the cutting speed signal which are intermittently measured by a timing signal of said grinding stone table position measuring device caused by reciprocating movement of said grinding stone table during a grinding process are held as sampling signals, a transient residual cutting amount signal $g_0$ is obtained by subtracting said workpiece size signal from said sampled cutting table position signal, said error cutting residual amount signal $g_3$ is obtained by subtracting said standard cutting residual amount signal $g_1$ from said transient cutting residual amount signal $g_0$, said speed correction signal $V.g_3$ is obtained by dividing said error cutting residual amount signal $g_3$ by said sampled time interval T, said speed correction signal $V.g_3$ is added to said sampled cutting speed signal V, and a composite signal composed of said speed correction signal $V.g_3$ and said cutting speed signal V is applied to said cutting motor to control the cutting speed until the next sampling time thereby effecting a smooth feeding of said cutting table.

* * * * *